(12) United States Patent
Seibold

(10) Patent No.: US 10,967,771 B2
(45) Date of Patent: Apr. 6, 2021

(54) SEAT SUPPORT STRUCTURE AND A SEAT STRUCTURE INCLUDING THE SEAT SUPPORT STRUCTURE

(71) Applicant: Adient Luxembourg Holding S.à.r.l., Luxembourg (LU)

(72) Inventor: Kurt Seibold, Farmington Hills, MI (US)

(73) Assignee: Adient Luxembourg Holding S.ár.l., Luxembourg (LU)

( * ) Notice: Subject to any disclaimer, the term of this patent is extended or adjusted under 35 U.S.C. 154(b) by 0 days.

(21) Appl. No.: 15/573,949

(22) PCT Filed: May 13, 2016

(86) PCT No.: PCT/US2016/032293
§ 371 (c)(1),
(2) Date: Nov. 14, 2017

(87) PCT Pub. No.: WO2016/186990
PCT Pub. Date: Nov. 24, 2016

(65) Prior Publication Data
US 2018/0290575 A1      Oct. 11, 2018

Related U.S. Application Data

(60) Provisional application No. 62/162,172, filed on May 15, 2015.

(51) Int. Cl.
| | | |
|---|---|---|
| *A47C 7/02* | (2006.01) |
| *B60N 2/68* | (2006.01) |
| *B60N 2/50* | (2006.01) |
| *B60N 2/70* | (2006.01) |
| *B60N 2/16* | (2006.01) |
| *B60N 2/58* | (2006.01) |
| *A47C 7/28* | (2006.01) |
| *A47C 7/16* | (2006.01) |
| *B60N 2/54* | (2006.01) |

(52) U.S. Cl.
CPC .............. *B60N 2/686* (2013.01); *A47C 7/282* (2013.01); *B60N 2/16* (2013.01); *B60N 2/50* (2013.01); *B60N 2/58* (2013.01); *B60N 2/5816* (2013.01); *B60N 2/70* (2013.01); *B60N 2/7005* (2013.01); *B60N 2/7011* (2013.01); *A47C 7/16* (2013.01); *B60N 2/546* (2013.01)

(58) Field of Classification Search
CPC . B60N 2/686; B60N 2/50; B60N 2/70; B60N 2/7005; B60N 2/7011; A47C 7/282; A47C 7/16
USPC .......................................... 297/452.56, 218.3
See application file for complete search history.

(56) References Cited

U.S. PATENT DOCUMENTS

| | | | | |
|---|---|---|---|---|
| 3,527,498 A | * | 9/1970 | Werner | .................... A47C 7/16 297/452.65 |
| 4,826,249 A | | 5/1989 | Bradbury | |
| 4,869,554 A | | 9/1989 | Abu-Isa et al. | |

(Continued)

FOREIGN PATENT DOCUMENTS

| | | |
|---|---|---|
| EP | 1 048 246 A1 | 11/2000 |
| WO | 2007/076536 A1 | 7/2007 |

*Primary Examiner* — Syed A Islam
(74) *Attorney, Agent, or Firm* — Marshall & Melhorn, LLC

(57) ABSTRACT

A seat support structure including an elastomeric panel. The elastomeric panel positions and supports a seated occupant. The panel is constrained on a forward side and a rearward side.

19 Claims, 17 Drawing Sheets

(56) References Cited

U.S. PATENT DOCUMENTS

| | | | |
|---|---|---|---|
| 5,013,089 A | | 5/1991 | Abu-Isa et al. |
| 5,775,779 A | | 7/1998 | Abu-Isa et al. |
| 6,027,171 A | * | 2/2000 | Partington ........... B60N 2/0232 |
| | | | 297/452.18 |
| 6,652,030 B2 | * | 11/2003 | Conner .................... A47C 7/56 |
| | | | 16/303 |
| 8,590,978 B2 | * | 11/2013 | Jaranson ................ B60N 2/643 |
| | | | 297/218.1 |
| 8,979,204 B2 | * | 3/2015 | Awata .................. B60N 2/5825 |
| | | | 297/218.3 |
| 9,278,634 B2 | * | 3/2016 | Mathews .................. B60N 2/66 |
| 2002/0089219 A1 | * | 7/2002 | Blanco ................ B60N 2/4221 |
| | | | 297/284.4 |
| 2004/0004375 A1 | * | 1/2004 | Garland .................... B62J 1/00 |
| | | | 297/204 |
| 2011/0049948 A1 | | 3/2011 | Hobl et al. |
| 2012/0013165 A1 | | 1/2012 | Di Giusto et al. |
| 2014/0110980 A1 | * | 4/2014 | Attey ........................ B62J 1/02 |
| | | | 297/215.16 |
| 2017/0246497 A1 | * | 8/2017 | Barsoe ................... A63B 69/06 |

\* cited by examiner

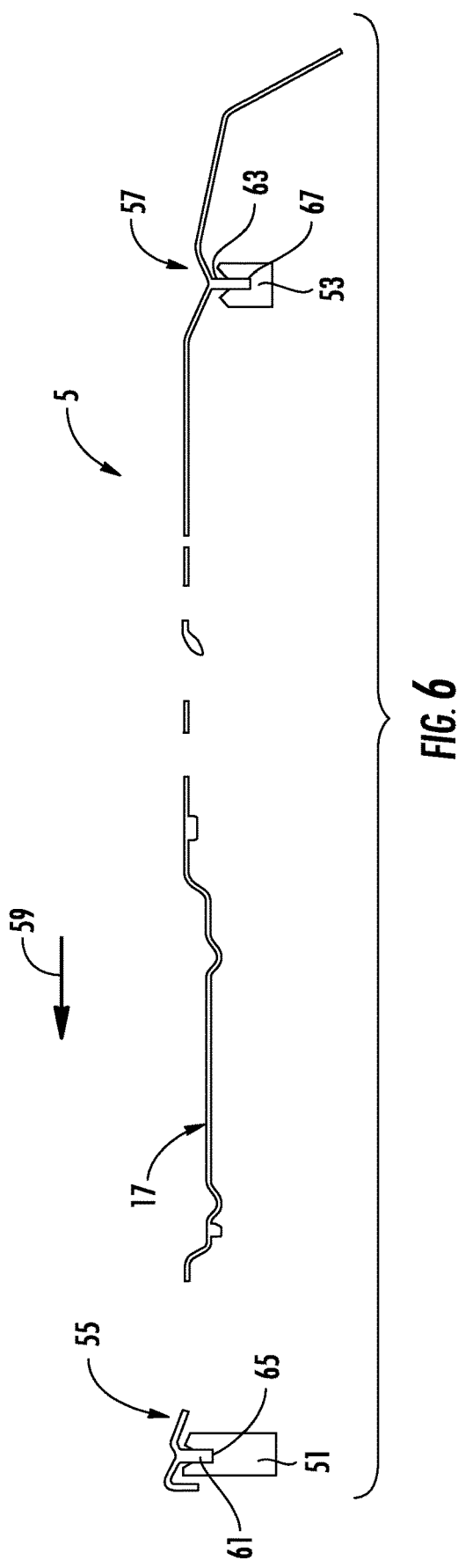
FIG. 6
FIG. 7

SEAT SUPPORT STRUCTURE AND A SEAT STRUCTURE INCLUDING THE SEAT SUPPORT STRUCTURE

CROSS REFERENCE TO RELATED APPLICATIONS

This application is a United States National Phase application of International Application PCT/US2016/032293 filed May 13, 2016 and claims the benefit of priority under 35 U.S.C. § 119 of U.S. provisional application 62/162,172 filed May 15, 2015, the entire contents of which are incorporated herein by reference.

FIELD OF THE INVENTION

The present invention relates to a seat support structure, and a seat structure that includes the seat support structure.

BACKGROUND OF THE INVENTION

Conventional seat support structures (seat cushions) for seats, particularly for seats in a motor vehicle, include foam. The foam used in conventional seat cushions provide for bulky seats that use an excessive amount of foam material, which increases manufacturing costs.

SUMMARY OF THE INVENTION

It is an object of the invention to provide a thin seat support structure (seat cushion) that conforms to a contour of an occupant.

According to the invention, a seat cushion comprises an elastomeric panel. The elastomeric panel positions and supports a seated occupant. The panel is constrained on a forward side and a rearward side of the seat cushion with respect to a traveling direction of a vehicle.

The elastomeric panel may be further constrained from an inboard side of the seat cushion and an outboard side of the seat cushion.

The panel may be made of a thermoplastic elastomer.
The seat cushion may further comprise a foam pad.
The seat cushion may further comprise a trim cover.
The trim cover may comprise an attachment means for attachment to the elastomeric panel.

The elastomeric panel and the attachment means may be unitary (integrally connected to form a one piece elastomeric panel and attachment means structure). The elastomeric panel and the attachment means may be formed of the same material in a single forming operation.

The foam pad may comprise an opening and the trim cover attachment means may extend through the opening. The trim cover attachment means may be attached to the elastomeric panel.

The elastomeric panel may bend when loaded and then may be pulled in tension when a further load is applied.

According to the invention, a seat structure comprises an elastomeric panel for supporting a seated occupant, a first elastomeric panel support component and a second elastomeric panel support component. A forward side of the elastomeric panel is supported via the first elastomeric panel support component and a rearward side of the elastomeric panel is supported via the second elastomeric panel support component with respect to a traveling direction of a vehicle.

The seat structure may further comprise a third elastomeric panel support component and a fourth elastomeric panel support component. The elastomeric panel may be supported on a first lateral side via the third elastomeric panel support component and the elastomeric panel may be supported on a second lateral side via the fourth elastomeric panel support component. The first lateral side and the second lateral side may extend parallel to the traveling direction. The rearward side and the forward side may extend perpendicular to the traveling direction. The first elastomeric panel support component and the second elastomeric panel support component may define a longitudinal support structure. The third elastomeric panel support component and the fourth elastomeric panel support component may define a lateral support structure.

The seat structure may further comprise an interconnecting means between the longitudinal support structure and the lateral support structure for allowing movement of the longitudinal support structure with a degree of freedom relative to the lateral support structure. The elastomeric panel may have lateral portions that work in a manner to provide support to an occupant during ingress and egress. One or more of the lateral portions may deflect in a torsional manner about a respective lateral support component and provide support to the occupant. The lateral portions also may provide lateral support to the occupant when the occupant is a seated position.

The elastomeric panel may manage occupant loads based on a principle of a distributed beam. Once the loads exceed that of the occupant the panel may go into tension to limit deflection.

The elastomeric panel may be a one-piece elastomeric panel structure. The one-piece elastomeric panel structure may comprise a thermoplastic elastomer. The one-piece elastomeric panel structure may be formed entirely of the thermoplastic elastomer.

The seat structure may further comprise a foam pad. The elastomeric panel may comprise a plurality of members for supporting the foam pad. The elastomeric panel may bend when loaded. The elastomeric panel may be in tension when a further load is applied.

The members may bend when loaded. The members may be in tension when the further load is applied.

According to the invention, a seat support structure comprises a single, one-piece elastomeric panel for supporting a seated occupant. The single, one-piece elastomeric panel comprises a front region and a rear region. The front region is opposite the rear region with respect to a longitudinal axis of the single, one-piece elastomeric panel. The front region and the rear region define support areas for supporting the single, one-piece elastomeric panel such that the single, one-piece elastomeric panel is constrained in a direction parallel to the longitudinal axis.

The single, one-piece elastomeric panel may comprise a first lateral portion and a second lateral portion. The first lateral portion and the second lateral portion may extend parallel to the longitudinal axis. The first lateral portion may define a first lateral support region and the second lateral portion may define a second lateral support region. The single, one-piece elastomeric panel may be supported in the first lateral support region and the second lateral support region such that the single, one-piece elastomeric panel is constrained in a direction perpendicular to the longitudinal axis.

The seat support structure may further comprise a first panel support structure, a second panel support structure, a third panel support structure and a fourth panel support structure. The first panel support structure may be connected to the elastomeric panel in the front region. The front region of the single, one-piece elastomeric panel may be supported via the first panel support structure. The second panel support structure may be connected to the elastomeric panel in the rear region. The rear region of the single, one-piece elastomeric panel may be supported via the second panel support structure. The third panel support structure may be connected to the elastomeric panel in the first lateral support region. The first lateral support region of the single, one-piece elastomeric panel may be supported via the third panel support structure. The fourth panel support structure may be connected to the elastomeric panel in the second lateral support region. The second lateral portion of the single, one-piece elastomeric panel may be supported via the fourth panel support structure.

The present invention is directed toward a seat support structure. The seat support structure is formed of thermoplastic elastomer (TPE). A total targeted penetration of the seat support structure is greater than 20 mm.

The present invention provides a unitary single process and material panel that is flexible and is no thicker than 5 mm and provides any and all features for suspension, bolster support, pressure distribution (the panel conforms to the shape of the occupant), trim attachment and structure affixment. This allows for a thinner seat that uses little or no foam and allows the packaging of the occupant closer to the structure due to managed pressure distribution. This in turn makes for a thin seat cushion system.

The panel includes bolsters that are unitarily constructed and the panel provides pressure distribution. Affixment to a structure provides torsional support/compliance as an occupant slides across for ingress and egress.

A center portion of the panel provides a sink in feel. The panel allows penetration of the occupant via geometry and material properties, which also allows the panel to distribute around and conform to the occupant, which can be done with a distributed beam. The center portion of the panel provides major support under the occupant, and a controlled lateral support/distribution, which may be done with cantilevered beams with a lateral sinusoidal step to allow movement of the insert section. The sinusoidal step may also accommodate a trim seam, which also allows the trim to deflect as the occupant penetrates the seat.

A front portion of the panel may provide a surface that allows forces from frontal impact to transfer into a lower structure in a compressive manner.

A cantilevered beam may be provided to prevent hammocking between the legs of the occupant.

The panel allows for side to side deflection and the ability to penetrate the panel. Cantilevered beams may be used to allow sink with low side pressure.

The present invention provides a thinner seat support structure because hugging of the occupant with the seat support structure comes from the panel and not deflection of foam as featured in conventional seat cushions.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
FIG. 6 is a cross sectional view of the seat support structure of FIG. 5 prior to the seat support structure being subjected to a load;
FIG. 7 is a cross-sectional view of the support structure of FIG. 5 after the support structure is subjected to a load.

DESCRIPTION OF THE PREFERRED EMBODIMENTS

Figure 1:
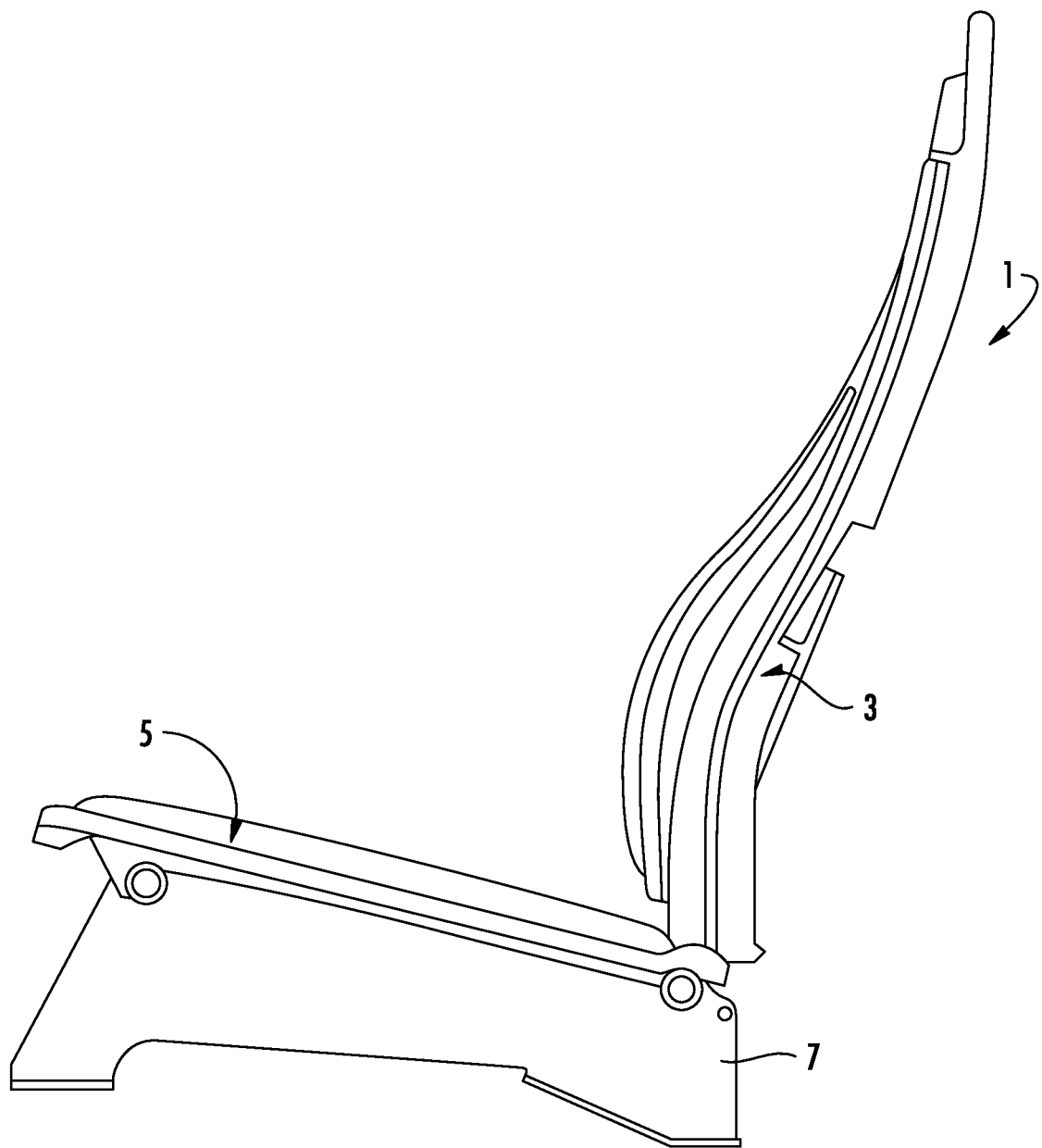
FIG. 1 is a side view of a seat.

Referring to the drawings in particular, FIG. 1 is a side view of a seat 1, particularly a seat for a motor vehicle. The seat 1 includes a seat back structure 3 and a seat support structure (seat cushion) 5. The seat support structure 5 is connected to a seat base structure 7. The seat back structure 3 may be movable relative to the seat support structure 5.

Figure 2:
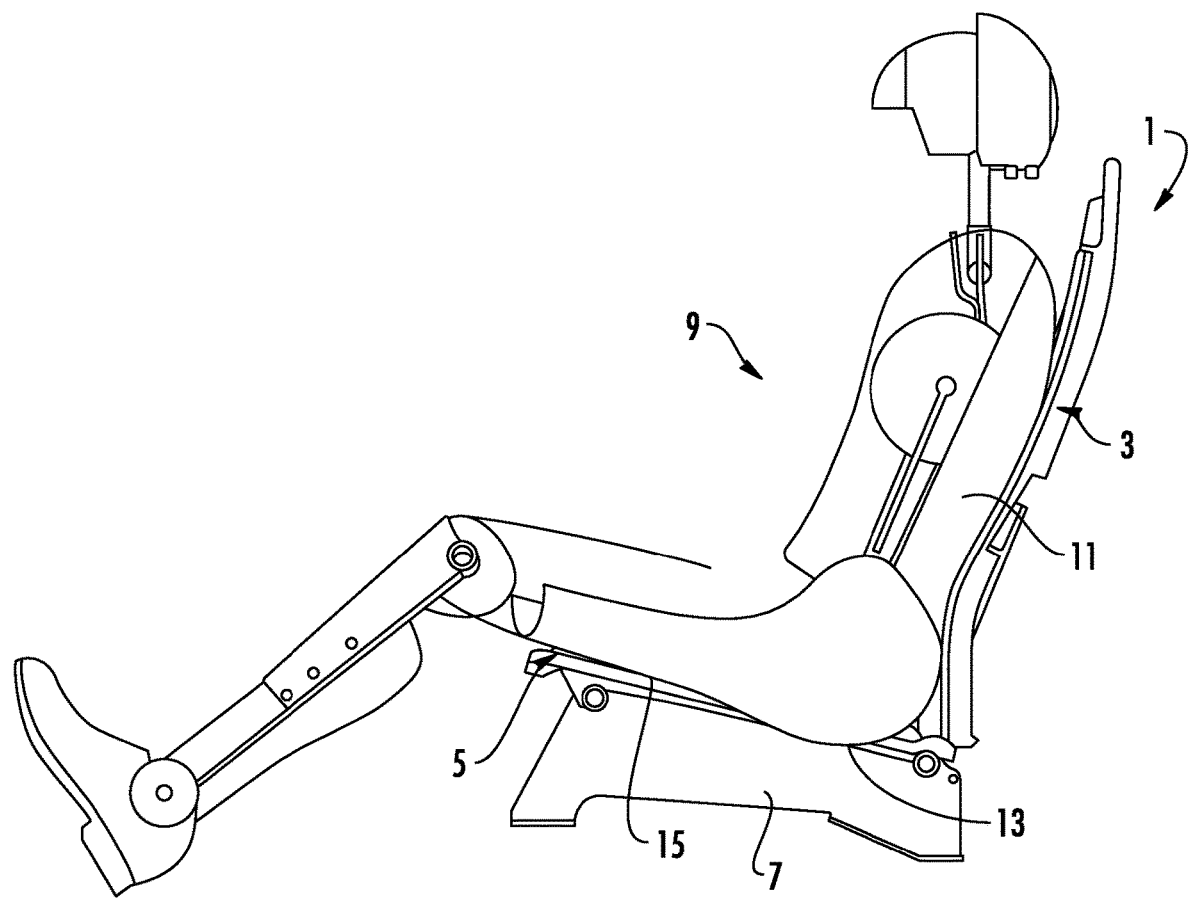
FIG. 2 is a side view of the seat of FIG. 1 with the seat supporting an occupant.

FIG. 2 is a side view of the seat 1 of FIG. 1 with the seat 1 supporting an occupant 9. The seat back structure 3 supports a back region 11 of the occupant 9. The seat support structure 5 supports a buttock portion 13 and a leg portion 15 of the occupant 9. A total targeted penetration of the seat support structure 5 is greater than 20 millimeters.

Figure 3:
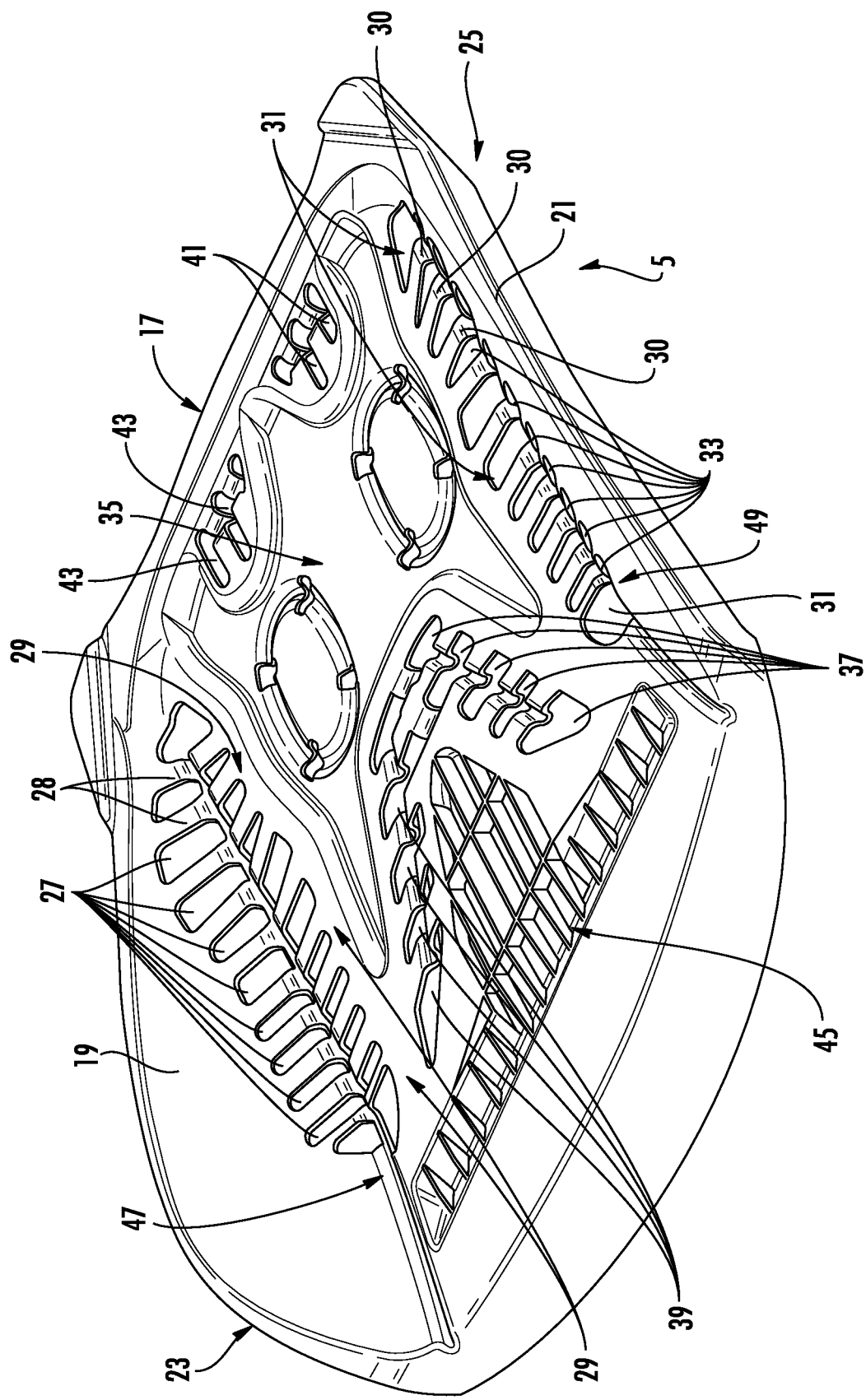
FIG. 3 is a top perspective view of a seat support structure of FIG. 1.

FIG. 3 is a perspective view of the seat support structure 5 of FIG. 1. The seat support structure 5 includes a single, one-piece elastomeric panel 17. The elastomeric panel 17 is no thicker than 5 millimeters. The elastomeric panel 17 is formed of thermoplastic elastomer (TPE). The TPE has both thermoplastic and elastomeric properties which permit flexibility of the elastomeric panel 17 while militating against a permanent set thereof. As such, the TPE has an ability to stretch to moderate elongations and return to an original shape. The TPE may comprise at least one of a styrenic block copolymer, thermoplastic olefinic elastomer, thermoplastic vulcanisate, thermoplastic polyurethane elastomer, melt processable rubber, thermoplastic polyester elastomer, and thermoplastic amide elastomer. In certain embodiments, the TPE has a flexural modulus in a range of about 0.02 GPa to about 0.8 GPa and a tensile strength in a range of about 10 MPa to about 100 MPa, and more preferably 0.29 GPa and a tensile strength of about 43 MPa. The elastomeric panel 17 includes a first side bolster 19 and a second side bolster 21. The first side bolster 19 is located on a first side 23 of the elastomeric panel 17. The first side bolster 19 includes openings 27. The second side bolster 21 is located on a second side 25 of the elastomeric panel 17. The second side bolster 21 includes openings 33. The elastomeric panel 17 includes an elastomeric portion (supporting section, insert region) 35 that is provided between the first side bolster 19 and the second side bolster 21. The elastomeric portion 35 may be provided in a central section of the elastomeric panel 17. The first side bolster 19 and the second side bolster 21 may be arranged at an angle greater than zero relative to the elastomeric portion 35. The elastomeric panel 17 includes a plurality of connecting portions 28, 30. The elastomeric portion 35 is connected to the first side bolster 19 by at least the connecting portions 28. The elastomeric portion 35 is connected to the second side bolster 21 by at least the connecting portions 30. The elastomeric portion 35 is connected to the first side bolster 19 and the second side bolster 21 by at least the connecting portions 28 and the connecting portions 30 such that the elastomeric portion 35 is able to move relative to the first side bolster 19 and the second side bolster 21 when a load is applied to the elastomeric panel 17 by the occupant 9. The elastomeric portion 35 may deflect more quickly than the first side bolster 19 and the second side bolster 21 when a load is applied to the elastomeric panel 17 by the occupant 9. The first side bolster 19 and the second side bolster 21 may deflect at a different rate than a rate of deflection of the elastomeric portion 35 when a load is applied to the elastomeric panel 17 by the occupant 9. The elastomeric portion 35 includes openings 29, openings 31, openings 37, openings 39, openings 41 and openings 43. Each opening 29 is located opposite one of the openings 27 of the first side bolster 19. The openings 29 may or may not be in communication with the openings 27. Each opening 31 is located opposite one of the openings 33 of the second side bolster 21. The openings 31 may or may not be in communication with the openings 33. The elastomeric portion 35 includes members 45 and connecting structures 47, 49. The members 45 may extend along the entire length of the elastomeric portion or only a part of the length of the elastomeric portion 35. The connecting structure 47 extends between the openings 27 and openings 29. The connecting structure 47 may be a large rib. The connecting structure 49 extends between the openings 31 and the openings 33. The connecting structure 49 may be a large rib.

Figure 4:
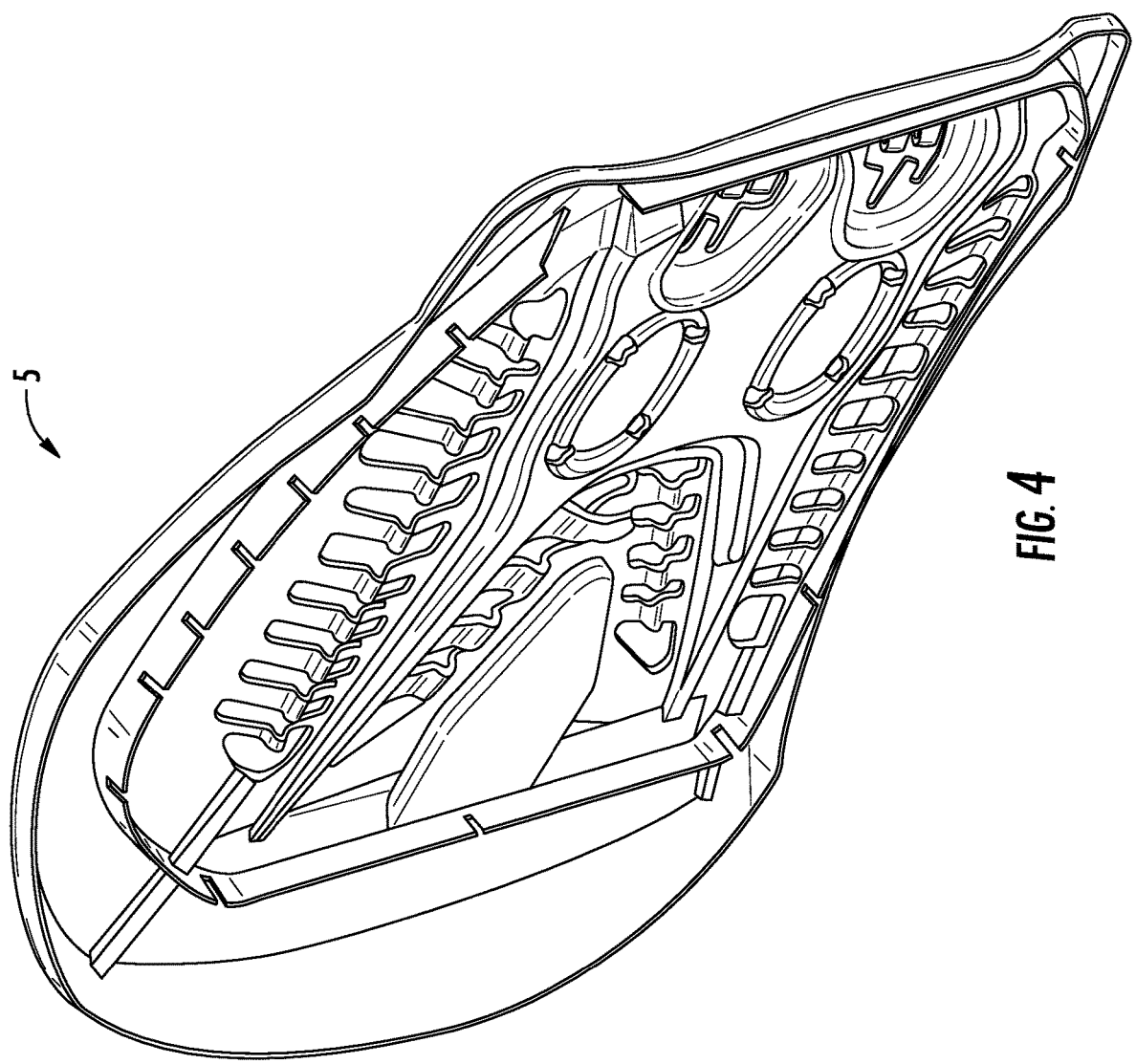
FIG. 4 is a bottom perspective view of the seat support structure of FIG. 1.

FIG. 4 is a bottom perspective view of the seat support structure (seat cushion) 5.

Figure 5:
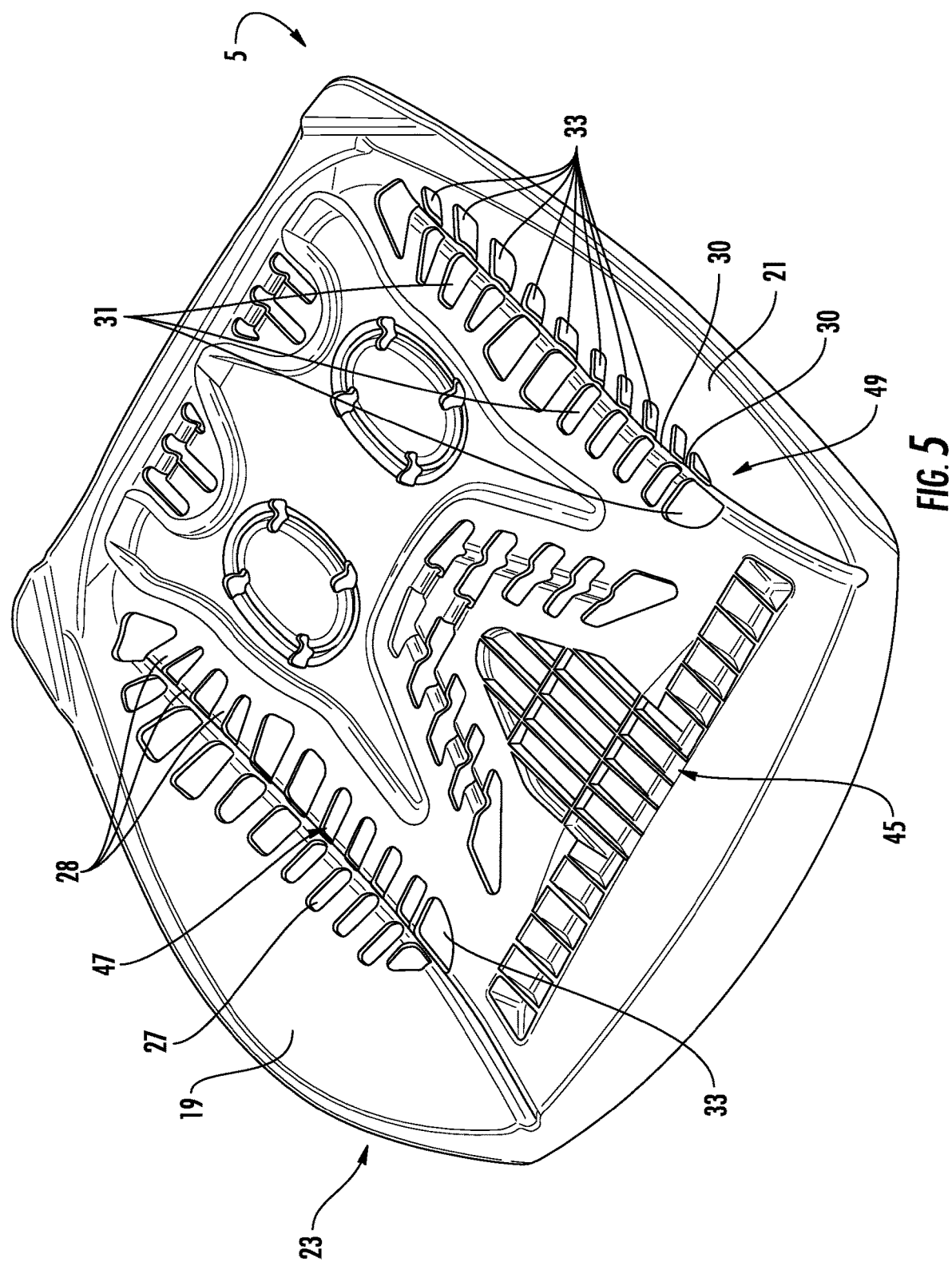
FIG. 5 is another top perspective view of the seat support structure of FIG. 1.

FIG. 5 is another perspective view of the seat support structure 5.

FIG. 6 is a cross sectional view of the seat support structure 5 of FIG. 5 prior to the seat support structure 5 being subjected to a load. The elastomeric panel 17 includes a front region 55 and a rear region 57. The front region 55 is located opposite the rear region 57 with respect to a traveling direction 59 of a vehicle (not shown). The front region 55 of the elastomeric panel 17 is supported by a first support structure 51. The rear region 57 of the elastomeric panel 17 is supported by a second support structure 53. The elastomeric panel 17 includes projecting portions 61, 63. The first support structure 51 includes an opening 65. The opening 65 receives the projecting portion 61 to fix the projecting portion 61 to the first support structure 51. The second support structure 53 includes an opening 67. The opening 67 receives the projecting portion 63 to fix the projecting portion 63 to the second support structure 53.

FIG. 7 is a cross sectional view of the support structure 5 of FIG. 5 after the support structure 5 is subjected to a load. The elastomeric panel 17 bends when loaded and then is pulled in tension when a further load is applied.

Figure 8:
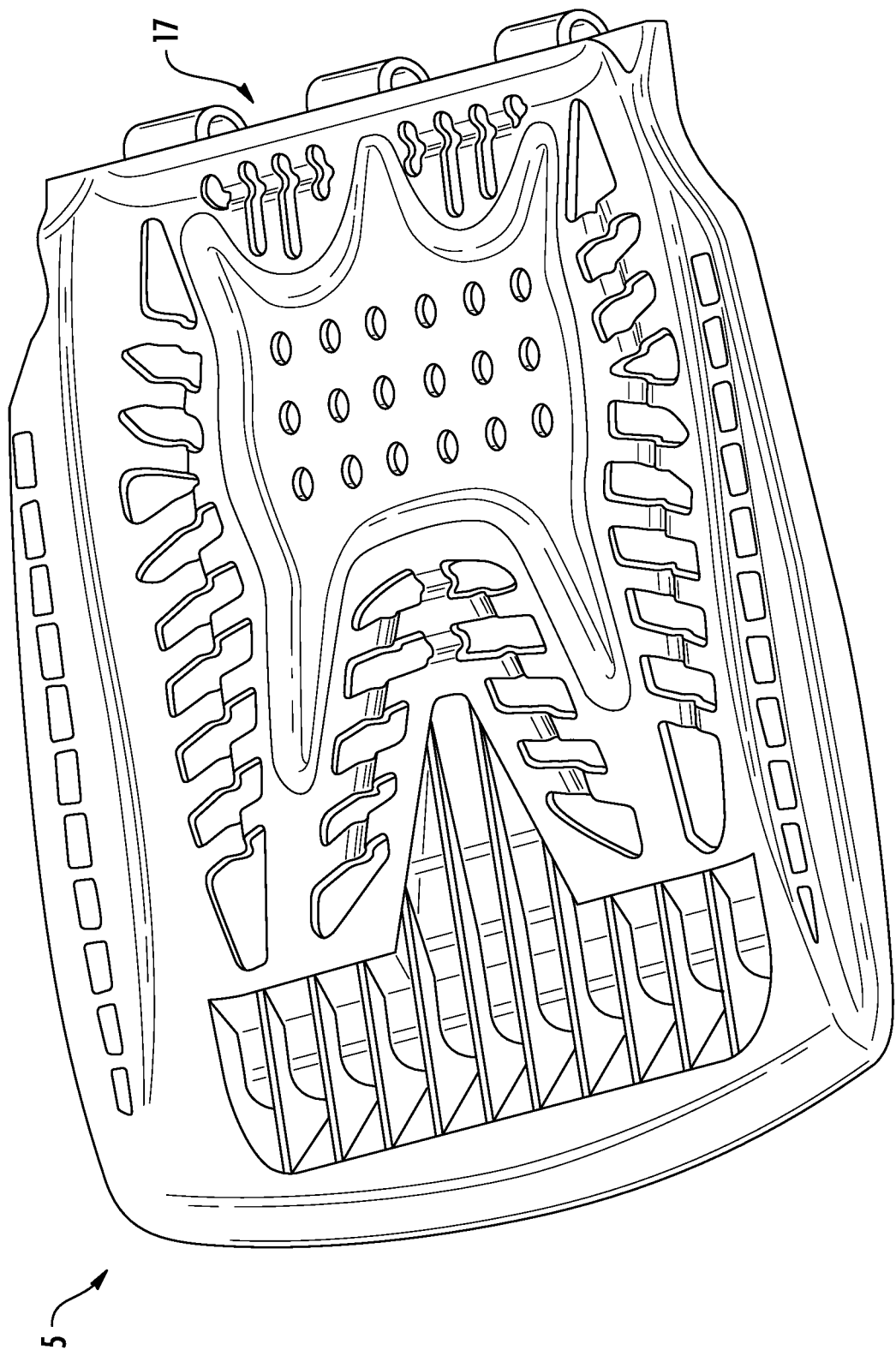
FIG. 8 is another perspective view of the seat support structure of FIG. 5.

FIG. 8 is another perspective view of the seat support structure 5 of FIG. 5.

Figure 9:
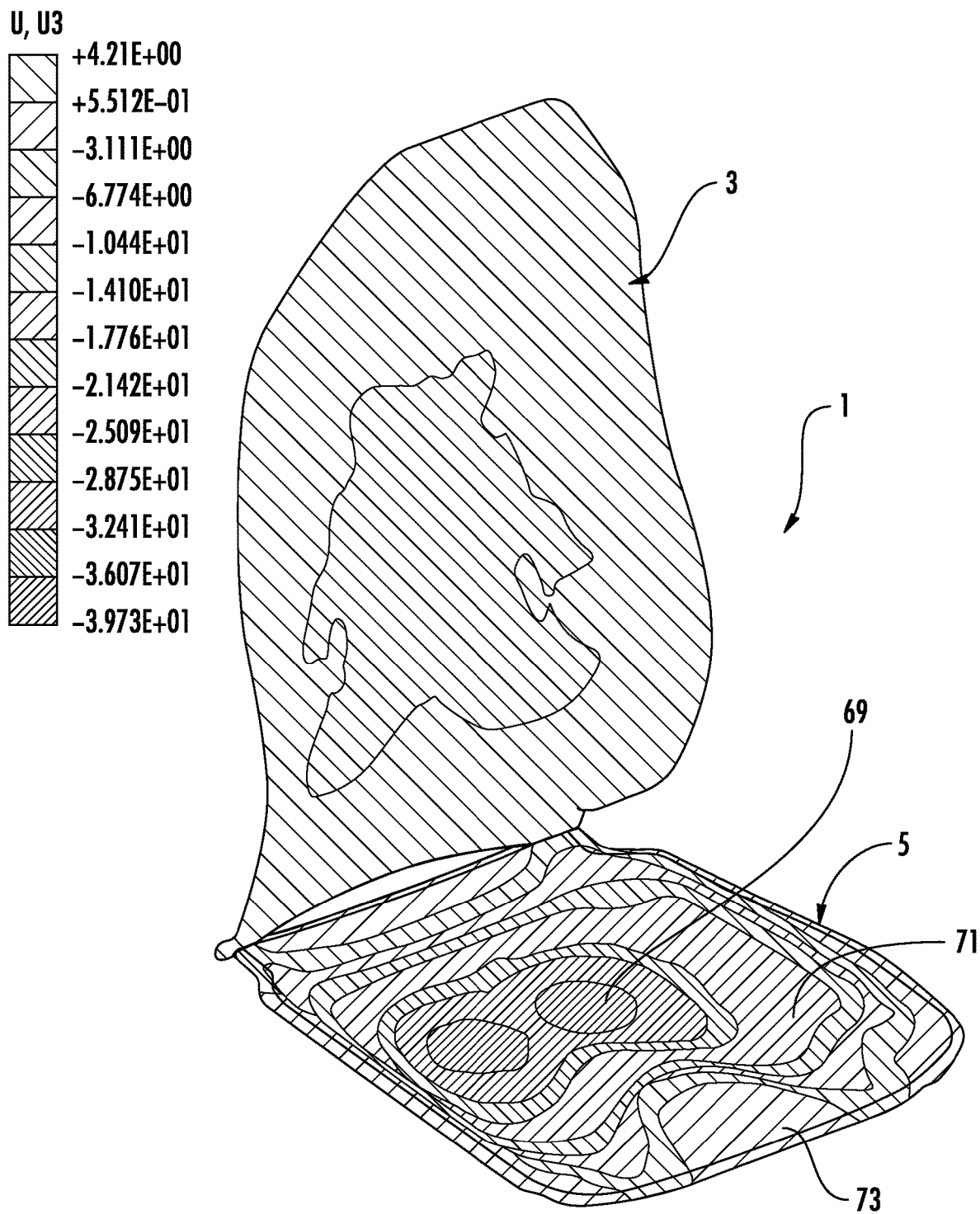
FIG. 9 is a perspective view of the seat of FIG. 1 showing a pressure distribution of the seat support structure when an occupant is seated in the seat.

FIG. 9 is a perspective view of the seat 1 of FIG. 1 showing a pressure distribution of the seat support structure 5 when an occupant is seated in the seat 1. Pressure is applied in regions or areas 69, 71, 73 of the seat support structure 5. The pressure applied in the area 69 is greater than the pressure applied in the area 71 and the area 73 of the seat support structure 5. The pressure applied to the area 73 of the seat support structure 5 is less than the pressure applied to the area 71. The structure of the seat support structure 5 is such that side to side deflection is allowed and hammocking of the seat support structure between an occupant's legs is prevented. The seat support structure 5 is such that lateral hammocking is not attained. This is done to control the high lateral pressures on the occupant that could present themselves if not managed.

Figure 10:
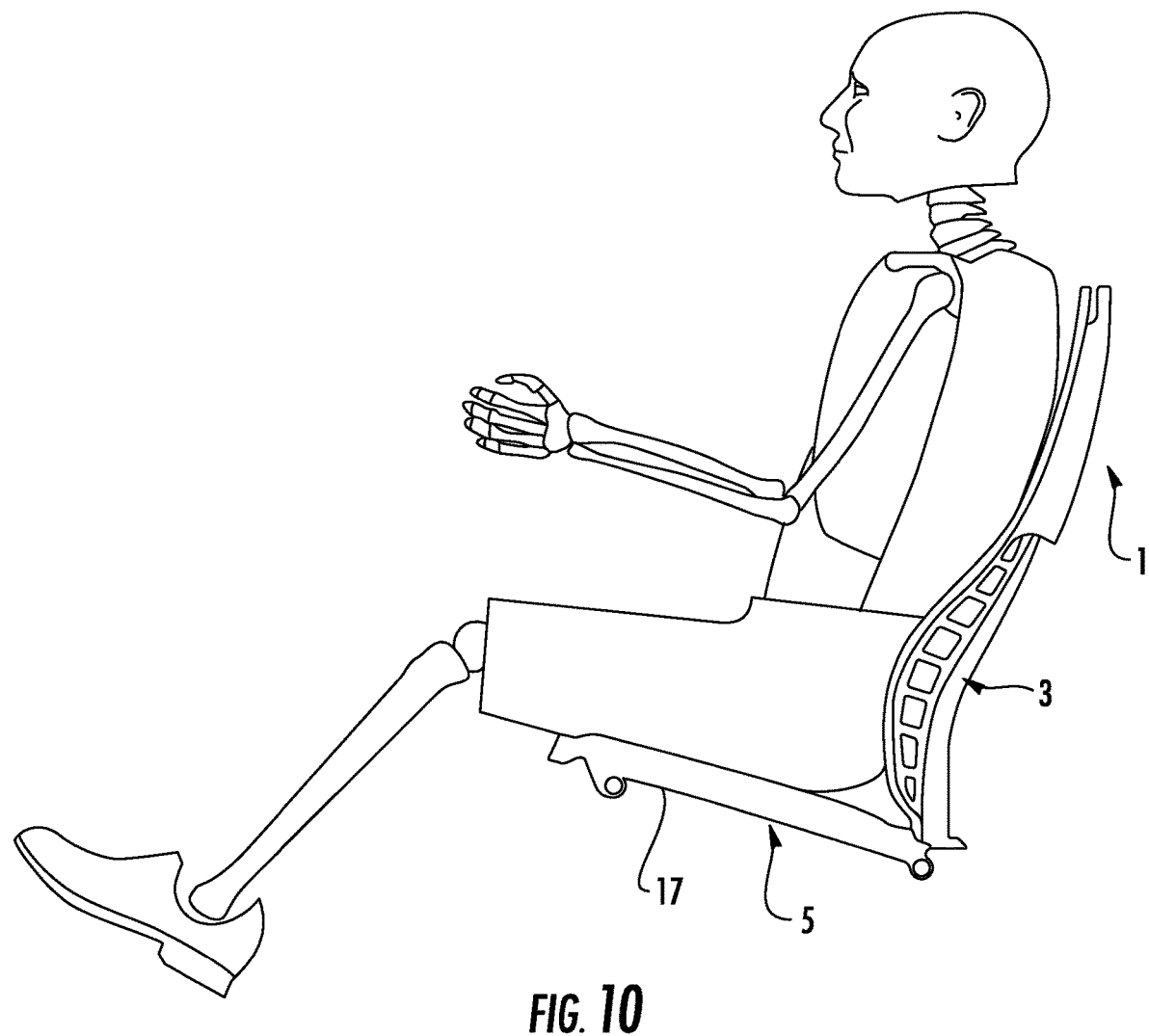
FIG. 10 is a side view of the seat of FIG. 1 with the occupant applying a first load on the seat.

FIG. 10 is a side view of the seat of FIG. 1 with the occupant 9 applying a first load on the seat 1 before the occupant 9 has fully positioned himself or herself in the seat 1, such as when the occupant 9 first sits in the seat 1. Before the occupant 9 is fully positioned in the seat 1, the elastomeric panel 17 bends.

Figure 11:
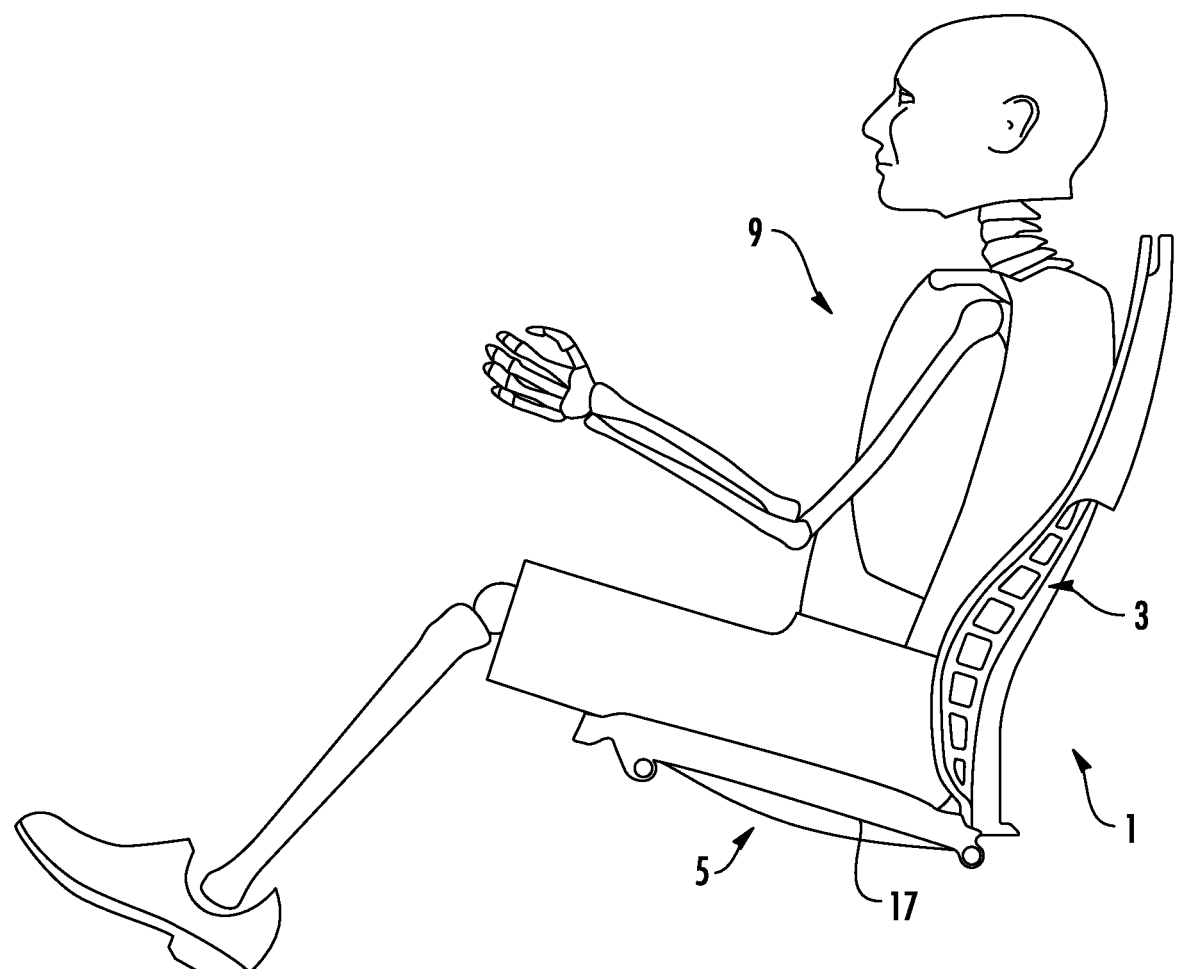
FIG. 11 is a side view of the seat of FIG. 1 with the occupant applying a second load on the seat.

FIG. 11 is a side view of the seat 1 of FIG. 1 with the occupant 9 applying a second load on the seat 1. FIG. 11 shows the situation in which the occupant 9 has fully positioned himself or herself in the seat 1. After the occupant 9 is fully positioned in the seat 1 as shown in FIG. 11, the elastomeric panel 17 has conformed to the occupant.

Figure 12:
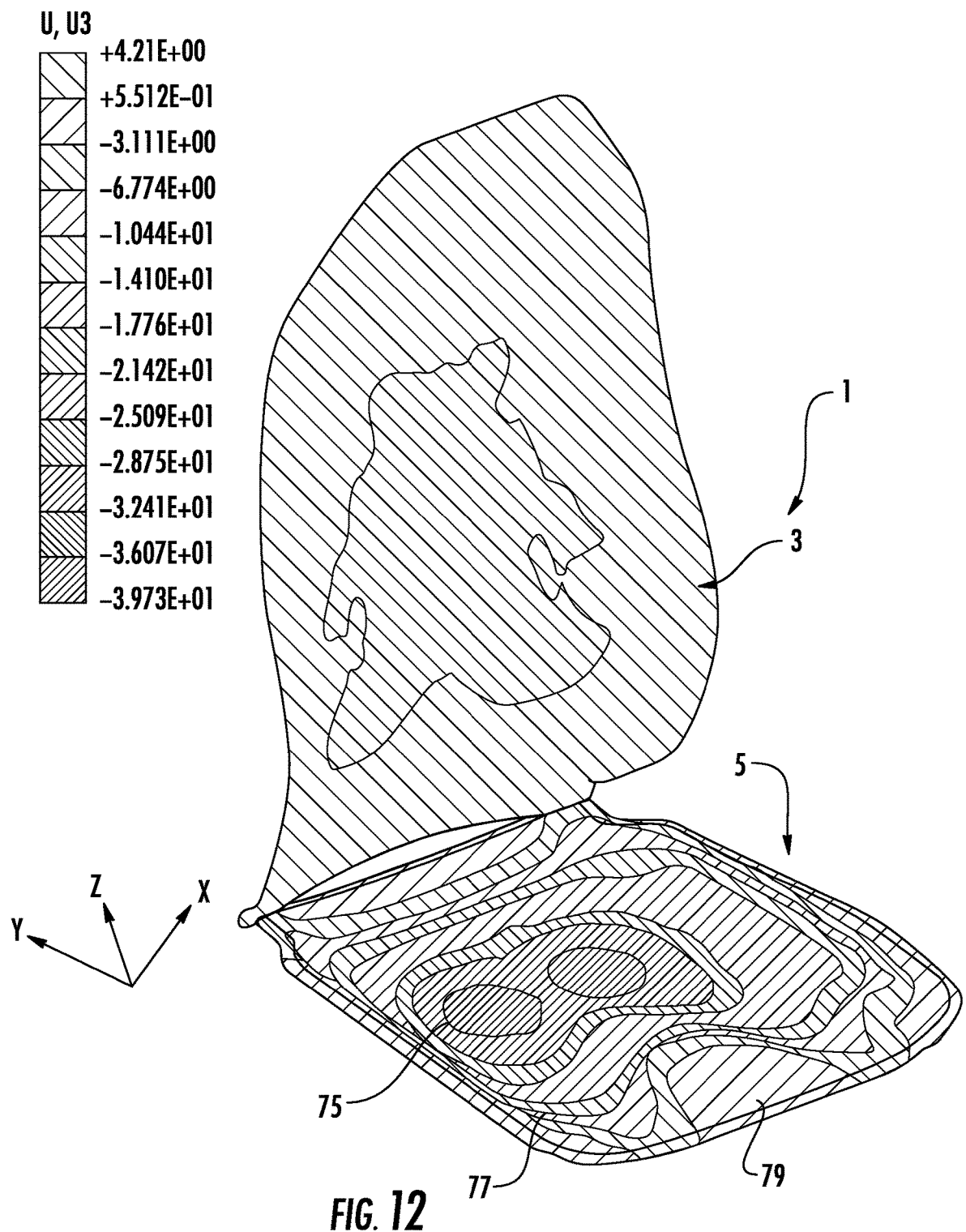
FIG. 12 is a perspective view of the seat of FIG. 1 showing a displacement of the seat support structure.

FIG. 12 is a perspective view of the seat 1 of FIG. 1 showing a displacement of the seat support structure 5 in a z-direction when the occupant 9 is seated in the seat 1. The seat support structure 5 is displaced in regions or areas 75, 77, 79. An amount of displacement in the area 75 is greater than the amount of displacement that occurs in the area 77 and the area 79 of the seat support structure 5. The amount of displacement that occurs in the area 79 of the seat support structure 5 is less than the amount of displacement that occurs in area 75 and area 77. The area 77 is displaced by an amount that is greater than the amount of displacement that occurs in area 79, but less than the amount of displacement that occurs in the area 75.

Figure 13:
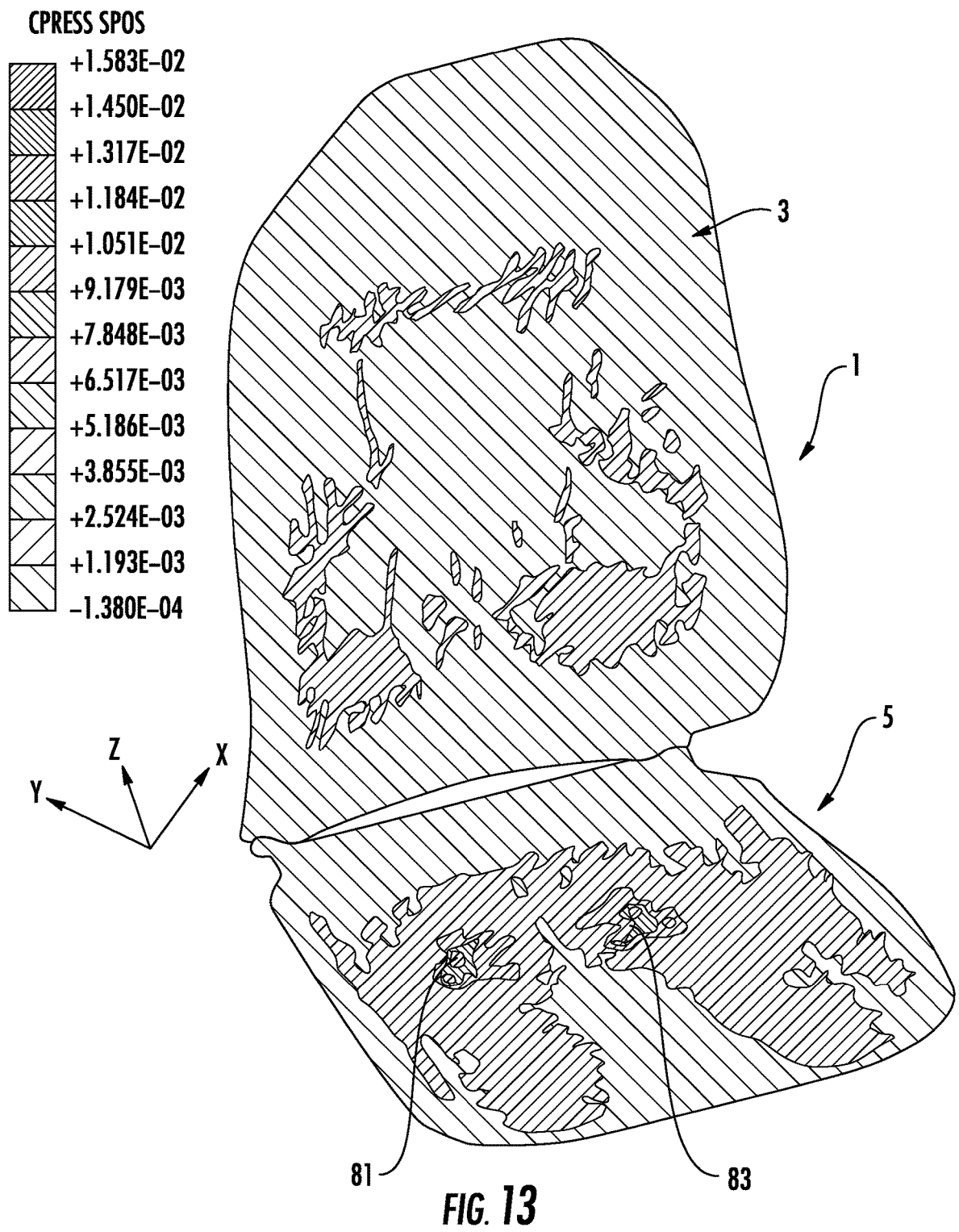
FIG. 13 is a perspective view of the seat of FIG. 1 showing pressures applied to the seat when an occupant is seated in the seat.

FIG. 13 is a perspective view of the seat 1 of FIG. 1 showing pressures applied to the seat 1 when an occupant is seated in the seat 1. Pressure is applied by an occupant in areas 81, 83 of the seat support structure 5 that is greater than other areas of the seat support structure 5.

Figure 14:
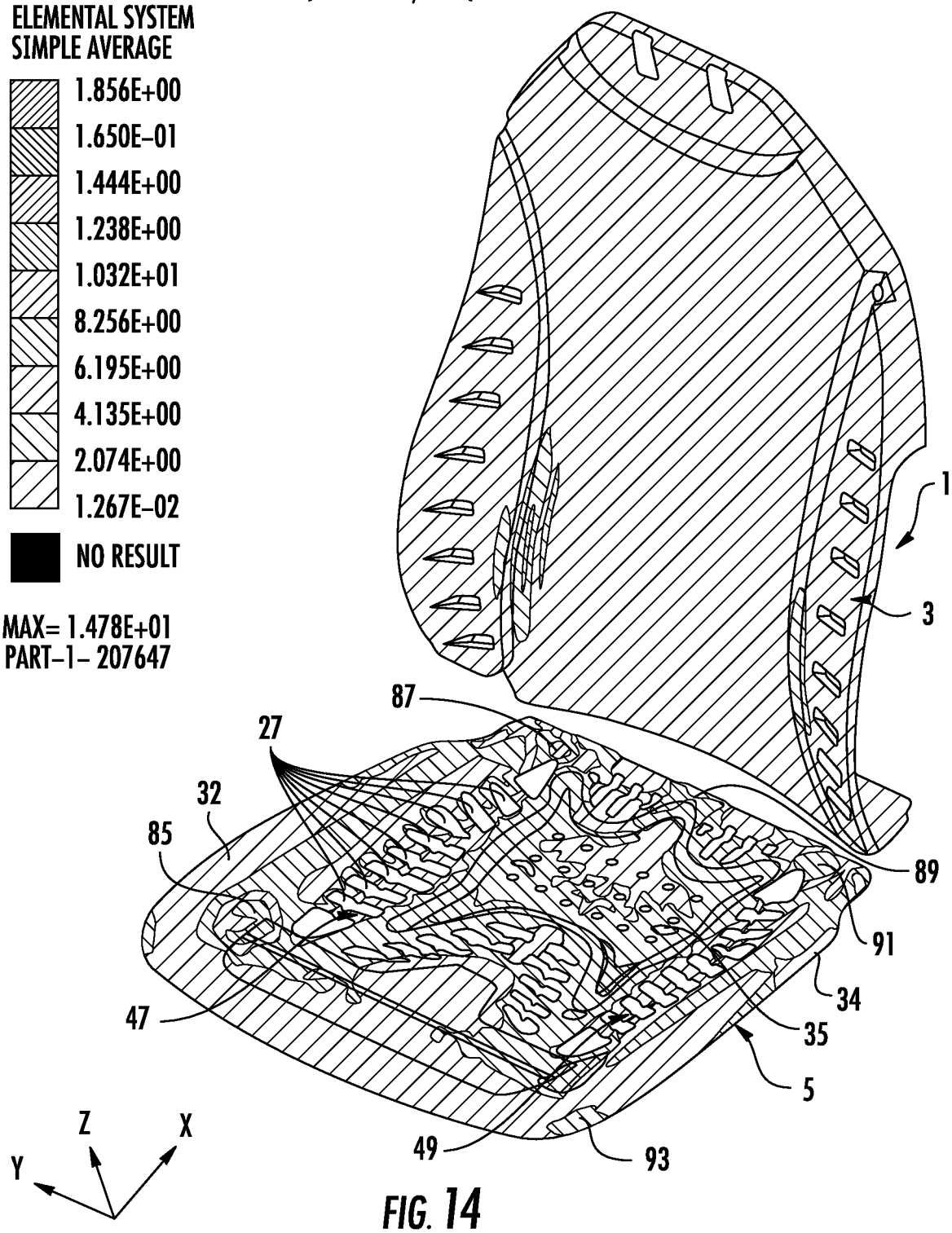
FIG. 14 is a perspective view of the seat of FIG. 1 showing a Von-Mises stress distribution.

FIG. 14 is a perspective view of the seat 1 of FIG. 1 showing a Von-Mises stress distribution of the seat back structure 3 and the seat support structure 5. The seat support structure 5 is subjected to the greatest amount of stress in areas 85, 87, 89, 91. This high stress is typical for attachment points in an area where the design is focused in the elastomeric portion (supporting center section) 35 where it is designed to work like a distributed beam. Openings (holes) 27, 33 flaring off to a respective side 32, 34 of the seat support structure 5 are created to support the occupant and connecting structures (large ribs) 47, 49 allow deflection of the elastomeric portion 35.

Figure 15:
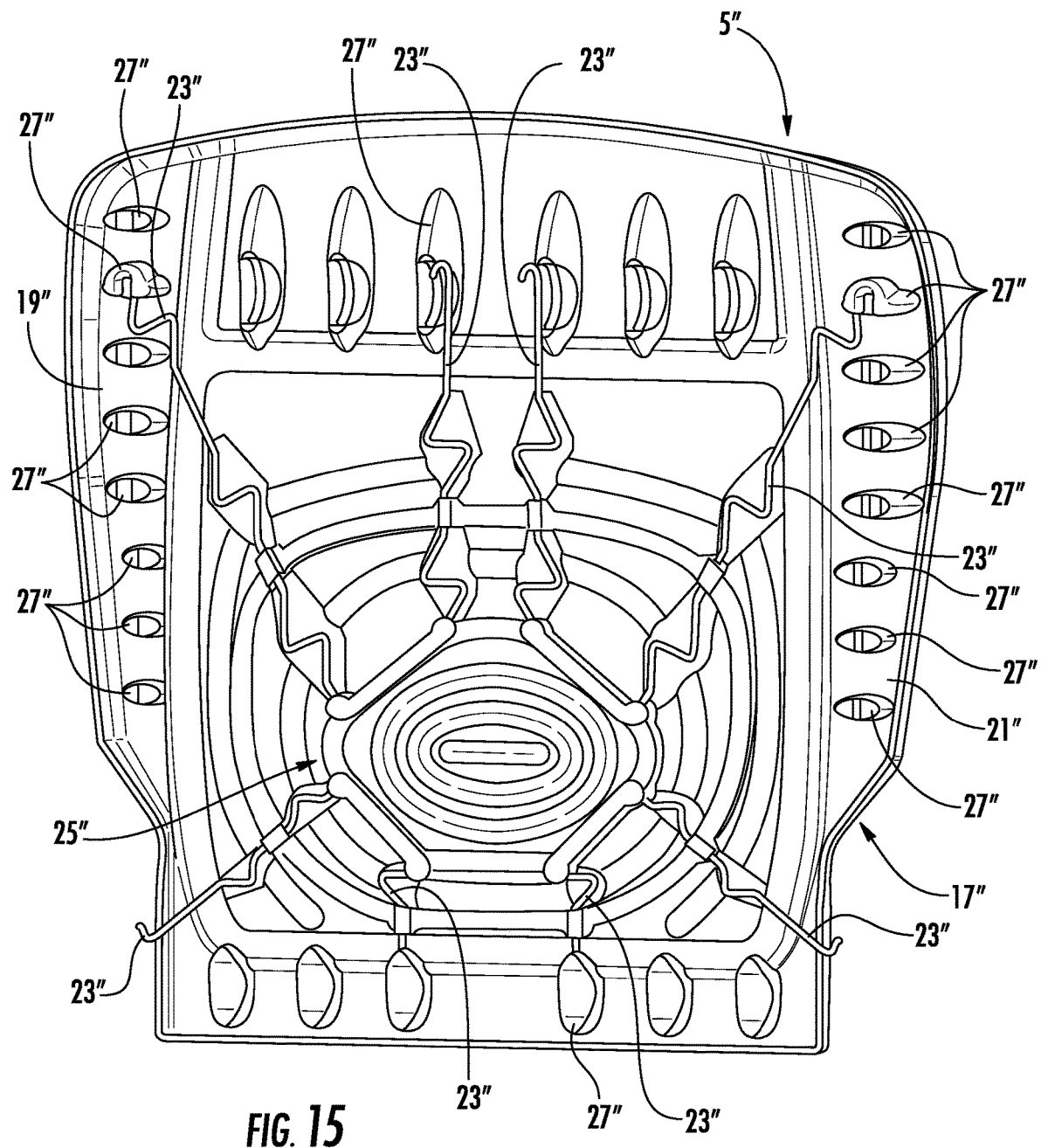
FIG. 15 is a bottom view of another embodiment of a seat support structure.

FIG. 15 is a bottom view of another embodiment of a seat support structure 5″. The seat support structure 5″ includes a single, one-piece elastomeric panel 17″. The single, one-piece elastomeric panel 17″ includes a first side bolster 19″, a second side bolster 21″ and connecting structures 27″. Springs 23″ are connected to the connecting structures 27″ and a portion 25″ of the elastomeric panel 17″. Any number of springs 23″ may be provided, but preferably at least four springs 23″ are provided. An object of providing the elastomeric panel 17″, which is thin, is to provide a delectable three-dimensional supporting surface. In order to provide a delectable three-dimensional supporting surface, springs 23 are provided in an array to make deflection follow contours of the occupant.

Figure 16:
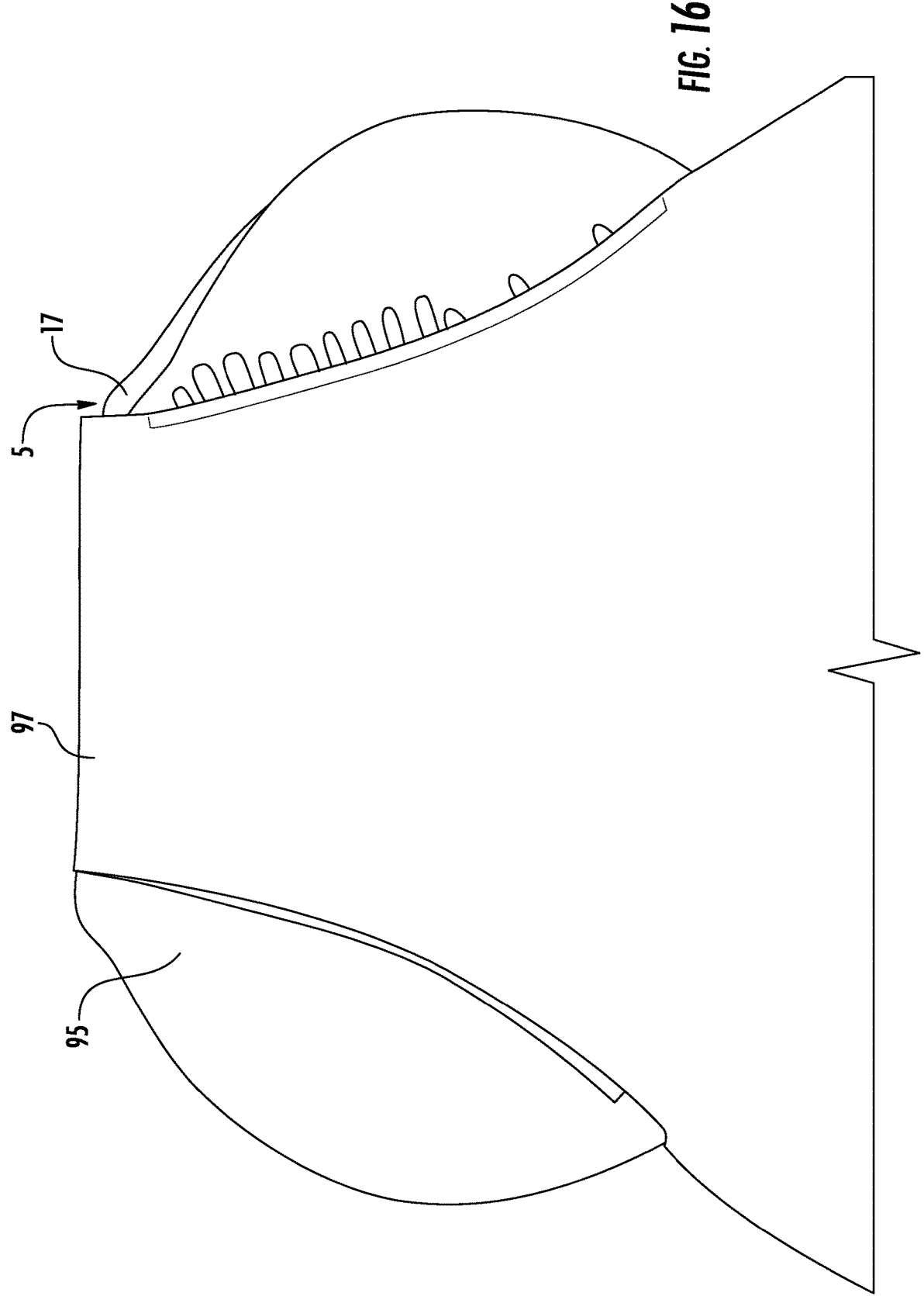
FIG. 16 is a partial top view of the seat support structure of FIG. 3.

FIG. 16 is a partial top view of the seat support structure 5 of FIG. 3. A foam pad 95 and a trim cover 97 are connected to the seat support structure 5.

Figure 17:
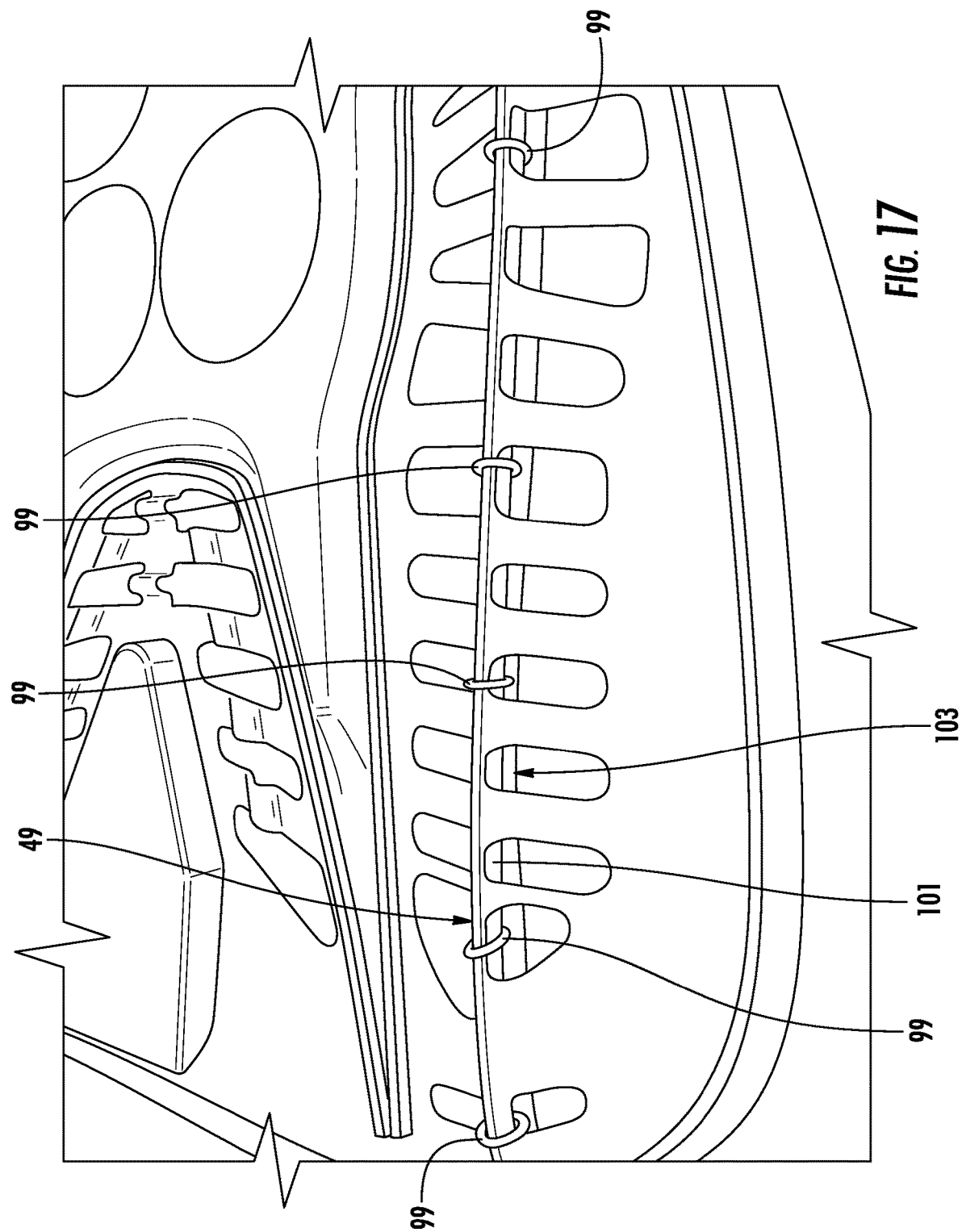
FIG. 17 is a partial perspective view of the seat support structure of FIG. 3.

FIG. 17 is a partial perspective view of the seat support structure 5 of FIG. 3. The seat support structure 5 is connected to a component 101, such as a trim component, of a seat structure 103 by connectors 99. Each of the connectors 99 surrounds at least a portion of the connecting structure 49 and at least a portion of the component (trim component) 101 of the seat structure 103. The connectors may be of any type of connector, including rings, preferably hog rings.

Figure 18:
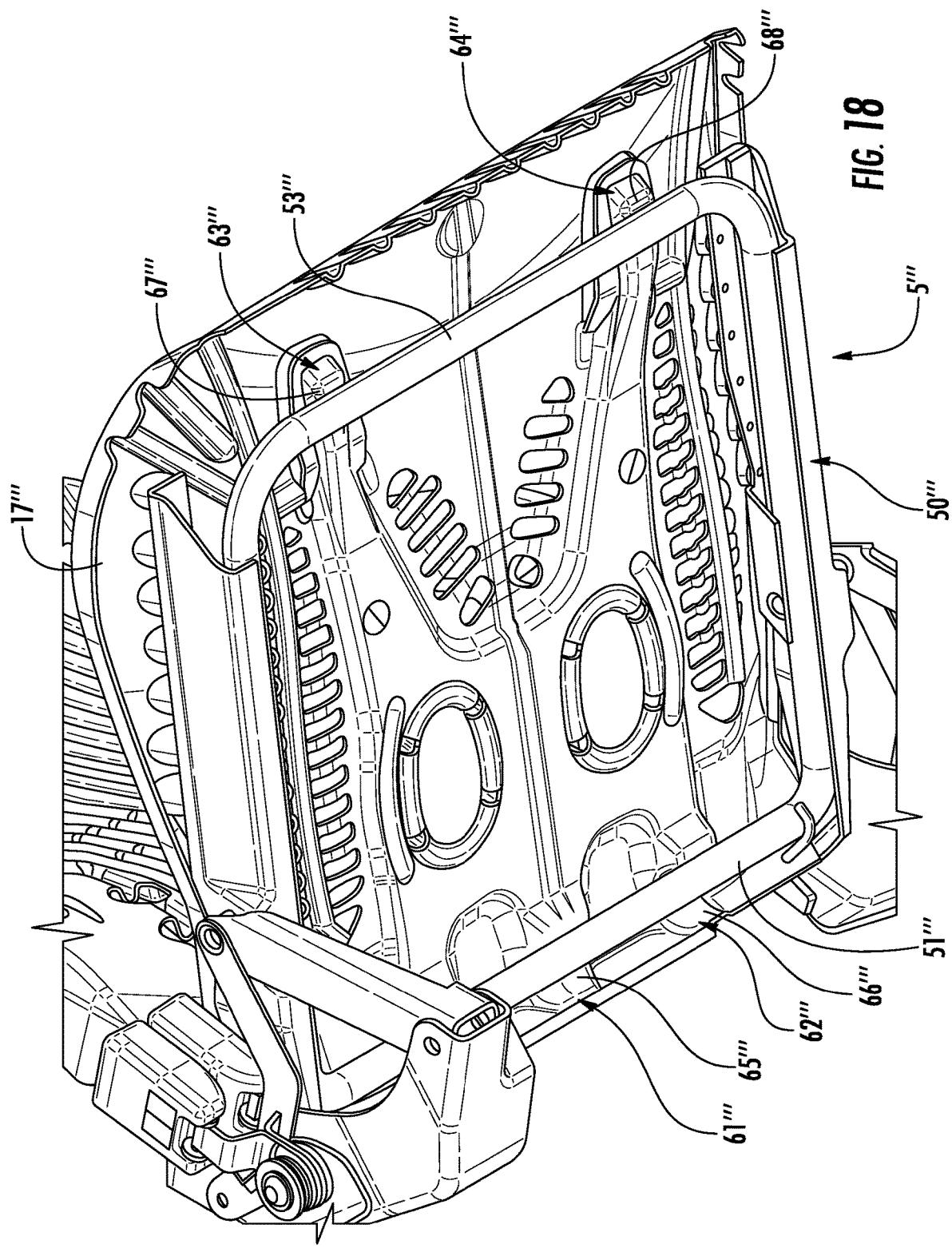
FIG. 18 is bottom perspective view of yet another embodiment of a seat support structure.

FIG. 18 is bottom perspective view of yet another embodiment of a seat support structure 5‴. The seat support structure 5‴ includes a single, one-piece elastomeric panel 17‴. The single, one-piece elastomeric panel 17‴ is identical to the single, one-piece elastomeric panel 17 shown in FIGS. 1-14 except the one-piece elastomeric panel 17‴ includes connecting elements 61‴, 62‴, 63‴, 64‴ for connecting the one-piece elastomeric panel 17‴ to a seat support structure 50‴. The connecting elements 61‴, 62‴, 63‴, 64‴ may be integrally connected to the one-piece elastomeric panel 17‴. Although four connecting elements 61‴, 62‴, 63‴, 64‴ are shown in FIG. 18, it is understood that any number of connecting elements may be used. The seat support structure 50‴ includes a seat support structure element 51‴ and a seat support structure element 53‴. The connecting elements 61‴, 62‴ engage the seat support structure element 51‴ and the connecting elements 63‴, 64‴ engage the seat support structure element 53‴. The connecting element 61‴ has a surface 65‴ for contacting the seat support structure element 51‴. The connecting element 62‴ has a surface 66‴ for contacting the seat support structure element 51‴. The connecting element 63‴ has a surface 67‴ for contacting the seat support structure element 53‴. The connecting element 64‴ has a surface 68‴ for contacting the seat support structure element 53‴. The surface 65‴ and the surface 66‴ are shown in FIG. 18 with an arcuate contour, but it is understood that the surface 65‴ and the surface 66‴ may have a different shape or contour, including a contour that is the same as the contour of the seat support structure element 51‴. The surface 67‴ and the surface 68‴ are shown in FIG. 18 with an arcuate contour, but it is understood that the surface 67‴ and the surface 68‴ may have a different contour or shape, including a contour that is the same as the contour of the seat support structure element 53‴. The seat support structure 50‴, including the seat support structure 51‴ and the seat support structure 53‴, is shown as a tubular structure, but it is understood that the seat support structure 50‴ can have a different structure with a different shape or contour. As in previous embodiments, the connecting element 61‴ interacts with the surface 65‴ and connecting element 62‴ interacts with the surface 66‴ in a manner that allows a center longitudinal section to deflect as a distributed beam and then go into tension.

While specific embodiments of the invention have been shown and described in detail to illustrate the application of the principles of the invention, it will be understood that the invention may be embodied otherwise without departing from such principles.

What is claimed is:

1. A seat cushion comprising:
an elastomeric panel, wherein said elastomeric panel positions and supports a seated occupant, wherein said panel is constrained on a forward side and a rearward side of the seat cushion with respect to a traveling direction of a vehicle, said elastomeric panel comprising an elastomeric portion, a first lateral elastomeric portion and a second lateral elastomeric portion, said elastomeric portion being located between said first lateral elastomeric portion and said second lateral elastomeric portion, said elastomeric portion being movable relative to said first lateral elastomeric portion and said second lateral elastomeric portion, said first lateral elastomeric portion, said second lateral elastomeric portion and said elastomeric portion being integrally connected to define a one-piece elastomeric panel, said first lateral elastomeric portion and said second lateral elastomeric portion defining at least a portion of an outer periphery of said one-piece elastomeric panel, at least one of said first lateral elastomeric portion and said second lateral elastomeric portion providing support to an occupant during ingress and egress and said at least one of said first lateral elastomeric portion and said second lateral elastomeric portion deflecting in a torsional manner to support the occupant;
wherein said elastomeric panel is constrained on said forward side of said seat cushion by a first support structure that receives a first portion of said elastomeric panel therein and on said rearward side of said seat cushion by a second support structure that receives a second portion of said panel therein;
wherein said elastomeric portion of said elastomeric panel is made from at least one thermoplastic elastomer, and
wherein said elastomeric portion of said elastomeric panel has a first area, a second area, and a third area, wherein an amount of displacement of said first area when a load is applied is greater than at least one of an amount of displacement of said second area and an amount of displacement of said third area, wherein said amount of displacement of said third area when said load is applied is less than at least one of said amount of displacement of said first area and said amount of displacement of said second area, and wherein said amount of displacement of said second area is at least one of less than said amount of displacement of said first area when said load is applied and greater than said amount of displacement of said third area when the load is applied.

2. A seat cushion in accordance with claim 1, wherein said elastomeric panel is further constrained from an inboard side of the seat cushion and an outboard side of the seat cushion.

3. A seat cushion in accordance with claim 1, further comprising a foam pad, wherein a rate of deflection of said first lateral elastomeric portion and said second lateral elastomeric portion is less than a rate of deflection of said elastomeric portion.

4. A seat cushion in accordance with claim 3, further comprising a trim cover, said first lateral elastomeric portion comprising a first side bolster, said second lateral elastomeric portion comprising a second side bolster.

5. A seat cushion in accordance with claim 4, wherein said trim cover comprises an attachment means for attachment to said elastomeric panel, said first side bolster and said second side bolster being at an angle relative to said elastomeric portion, wherein said first side bolster, said angle not being equal to zero.

6. A seat cushion in accordance with claim 5, wherein said elastomeric panel and said attachment means are unitary, formed of the same material in a single forming operation.

7. A seat cushion in accordance with claim 5, wherein said foam pad comprises an opening and said trim cover attachment means extend through said opening, wherein said trim cover attachment means is attached to said elastomeric panel.

8. A seat cushion in accordance with claim 1, wherein said elastomeric panel comprises an attachment means for attachment to a seat structure.

9. A seat cushion in accordance with claim 8, wherein said elastomeric panel and said attachment means are unitary.

10. A seat cushion in accordance with claim 9, wherein said elastomeric panel and said attachment means are formed of the same material in a single forming operation.

11. A seat cushion in accordance with claim 1, wherein a thickness of said elastomeric panel is less than 5 millimeters.

12. A seat structure comprising:
an elastomeric panel for supporting a seated occupant, said elastomeric panel comprising an elastomeric portion, a first lateral elastomeric portion and a second lateral elastomeric portion, said elastomeric portion being located between said first lateral elastomeric portion and said second lateral elastomeric portion, said elastomeric portion being movable relative to said first lateral elastomeric portion and said second lateral elastomeric portion, said first lateral elastomeric portion, said second lateral elastomeric portion and said elastomeric portion being integrally connected to define a one-piece elastomeric panel, said first lateral elastomeric portion and said second lateral elastomeric portion defining at least a portion of an outer periphery of said one-piece elastomeric panel, at least one of said first lateral elastomeric portion and said second lateral elastomeric portion providing support to an occupant during ingress and egress and said at least one of said first lateral elastomeric portion and said second lateral elastomeric portion deflecting in a torsional manner to support the occupant;
a first elastomeric panel support component;
a second elastomeric panel support component, wherein said elastomeric panel is supported on a forward side thereof via said first elastomeric panel support component and said elastomeric panel is supported on a rearward side thereof via said second elastomeric panel support component with respect to a traveling direction of a vehicle;
wherein said first elastomeric panel support component is comprised of a projecting portion unitary with said elastomeric panel that is received within an opening in a first support structure;
wherein said second elastomeric panel support component is comprised of a projecting portion unitary with said elastomeric panel that is received within an opening in a second support structure; and
wherein said elastomeric portion of said elastomeric panel includes a plurality of rib members formed therein, wherein said rib members extend in a front-to-rear direction of said elastomeric portion, and wherein said rib members are in tension when a load is applied.

13. A seat structure in accordance with claim 12, further comprising:
a third elastomeric panel support component;
a fourth elastomeric panel support component, wherein said elastomeric panel is supported on a first lateral side via said third elastomeric panel support component and said elastomeric panel is supported on a second lateral side via said fourth elastomeric panel support component, said first lateral side and said second lateral side extending parallel to the traveling direction, said rearward side and said forward side extending perpendicular to the traveling direction, said first elastomeric panel support component and said second elastomeric panel support component defining a longitudinal support structure, said third elastomeric panel support component and said fourth elastomeric panel support component defining a lateral support structure; and
an interconnecting means between the longitudinal support structure and the lateral support structure for allowing movement of the longitudinal support structure with a degree of freedom relative to the lateral support structure, said elastomeric panel comprising a lateral portion, one of said first lateral elastomeric portion and said second lateral elastomeric portion deflecting in a torsional manner about one of said third elastomeric panel support component and said fourth elastomeric panel support component to support the occupant, another one of said first lateral elastomeric portion and said second lateral elastomeric portion deflecting in a torsional manner about another one of said third elastomeric panel support component and said fourth elastomeric panel support component to support the occupant.

14. A seat structure in accordance with claim 13, wherein said one-piece elastomeric panel structure comprises a thermoplastic elastomer, wherein said elastomeric panel manages occupant loads based on a principle of a distributed beam, wherein once the loads exceed that of the occupant the panel goes into tension to limit deflection, wherein a rate of deflection of said first lateral elastomeric portion and said second lateral elastomeric portion is less than a rate of deflection of said elastomeric portion.

15. A seat structure in accordance with claim 13, further comprising a foam pad, wherein said rib members support said foam pad, and said elastomeric panel bends when loaded, said elastomeric panel being in tension when a load is applied, said first lateral elastomeric portion comprising a first side bolster, said second lateral elastomeric portion comprising a second side bolster.

16. A seat structure in accordance with claim 15, wherein said rib members bend when loaded, said first side bolster and said second side bolster being at an angle relative to said elastomeric portion, wherein said first side bolster, said angle not being equal to zero.

17. A seat support structure comprising:
a single, one-piece elastomeric panel for supporting a seated occupant, said single, one-piece elastomeric panel comprising a front region and a rear region, said front region being opposite said rear region with respect to a longitudinal axis of said single, one-piece elastomeric panel, said front region and said rear region defining support areas for supporting said single, one-piece elastomeric panel such that said single, one-piece elastomeric panel is constrained in a direction parallel to said longitudinal axis, said single, one-piece elastomeric panel comprising an elastomeric portion, a first lateral elastomeric portion and a second lateral elastomeric portion, said elastomeric portion being located between said first lateral elastomeric portion and said second lateral elastomeric portion, said elastomeric portion being movable relative to said first lateral elastomeric portion and said second lateral elastomeric portion, said first lateral elastomeric portion being integrally connected to said second lateral elastomeric portion and said elastomeric portion, said first lateral elastomeric portion and said second lateral elastomeric portion defining at least a portion of an outer periphery of said single, one-piece elastomeric panel, at least one of said first lateral elastomeric portion and said second lateral elastomeric portion providing support to an occupant during ingress and egress and said at least one of said first lateral elastomeric portion and said second lateral elastomeric portion deflecting in a torsional manner to support the occupant;

wherein said elastomeric panel is constrained on said front region by a first support structure that receives a first portion of said elastomeric panel therein and on said rear region by a second support structure that receives a second portion of said panel therein;

wherein said elastomeric portion of said elastomeric panel has a plurality of displacement areas, wherein an amount of displacement in one of the displacement areas when a load is applied is different from an amount of displacement in another one of the displacement areas when the load is applied.

18. A seat support structure in accordance with claim 17, wherein said first lateral elastomeric portion and said second lateral elastomeric portion extending parallel to said longitudinal axis, said first lateral elastomeric portion defining a first lateral support region and said second lateral elastomeric portion defining a second lateral support region, wherein said single, one-piece elastomeric panel is supported in said first lateral support region and said second lateral support region such that said single, one-piece elastomeric panel is constrained in a direction perpendicular to said longitudinal axis wherein a rate of deflection of said first lateral elastomeric portion and said second lateral elastomeric portion is less than a rate of deflection of said elastomeric portion.

19. A seat support structure in accordance with claim 18, further comprising:
a first panel support structure connected to said elastomeric panel in said front region, wherein said front region of said single, one-piece elastomeric panel is supported via said first panel support structure;
a second panel support structure connected to said elastomeric panel in said rear region, wherein said rear region of said single, one-piece elastomeric panel is supported via said second panel support structure;
a third panel support structure connected to said elastomeric panel in said first lateral support region, wherein said first lateral support region of said single, one-piece elastomeric panel is supported via said third panel support structure; and
a fourth panel support structure connected to said elastomeric panel in said second lateral support region, wherein said second lateral portion of said single, one-piece elastomeric panel is supported via said fourth panel support structure, said first lateral elastomeric portion comprising a first side bolster, said second lateral elastomeric portion comprising a second side bolster, said first side bolster and said second side bolster being at an angle relative to said elastomeric portion, wherein said first side bolster, said angle not being equal to zero.

* * * * *